(12) United States Patent
Nicholson, IV (10) Patent No.: US 7,353,784 B2
(45) Date of Patent: Apr. 8, 2008

(54) ROTARY INTERNAL COMBUSTION ENGINE

(76) Inventor: John W. Nicholson, IV, 1428 Avenue F, Marrero, LA (US) 70072

( * ) Notice: Subject to any disclaimer, the term of this patent is extended or adjusted under 35 U.S.C. 154(b) by 37 days.

(21) Appl. No.: 11/352,037

(22) Filed: Feb. 10, 2006

(65) Prior Publication Data

US 2007/0186897 A1    Aug. 16, 2007

(51) Int. Cl.
F02B 57/00 (2006.01)
F02B 57/08 (2006.01)
F01M 9/06 (2006.01)

(52) U.S. Cl. ............... 123/43 R; 123/44 B; 123/44 C; 123/44 D; 184/6.6; 184/11.1

(58) Field of Classification Search ............. 123/43 R, 123/44 B, 44 D, 44 C, 241, 242; 184/6.6, 184/11.1
See application file for complete search history.

(56) References Cited

U.S. PATENT DOCUMENTS

| | | | | |
|---|---|---|---|---|
| 1,042,675 A | * | 10/1912 | Helmes | 123/44 D |
| 1,047,227 A | * | 12/1912 | Hopkins | 60/729 |
| 1,138,388 A | * | 5/1915 | Levering | 123/44 D |
| 1,229,569 A | * | 6/1917 | Augustine | 184/6.6 |
| 1,231,927 A | * | 7/1917 | Marx | 184/6.6 |
| 1,272,791 A | * | 7/1918 | Freer | 123/44 D |
| 1,749,247 A | * | 3/1930 | Graham | 184/11.1 |
| 1,968,694 A | * | 7/1934 | Leibing | 123/44 C |
| 3,051,148 A | * | 8/1962 | Warner | 123/54.2 |
| 3,292,603 A | * | 12/1966 | Wayto | 123/43 R |
| 3,499,424 A | * | 3/1970 | Rich | 123/44 D |
| 3,659,562 A | * | 5/1972 | Jones | 418/85 |
| 3,665,811 A | * | 5/1972 | Van Avermaete | 91/492 |
| 4,078,529 A | * | 3/1978 | Warwick | 123/44 C |
| 4,318,370 A | | 3/1982 | Konther et al. | |
| 4,421,073 A | | 12/1983 | Arregui et al. | |
| 4,836,149 A | * | 6/1989 | Newbold | 123/44 R |
| 4,928,651 A | * | 5/1990 | Kronich | 123/196 AB |
| 5,123,394 A | | 6/1992 | Ogren | |
| 5,636,599 A | | 6/1997 | Russell | |
| 5,967,102 A | * | 10/1999 | Huang | 123/43 R |
| 6,062,175 A | * | 5/2000 | Huang | 123/43 R |
| 6,615,793 B1 | | 9/2003 | Usack | |
| 2003/0070632 A1 | | 4/2003 | De Bei | |
| 2003/0127062 A1 | * | 7/2003 | Ahn | 123/43 R |

FOREIGN PATENT DOCUMENTS

JP    55069727 A  *  5/1980

* cited by examiner

Primary Examiner—Thomas Denion
Assistant Examiner—Mary A Davis
(74) Attorney, Agent, or Firm—Keaty Professional Law Corporation (57) ABSTRACT

A rotary internal combustion engine has a circular inner chamber, which houses a plurality of cylinders with reciprocating pistons that move in a radial direction towards and away from the center of the inner chamber. A flywheel with distinct vanes or portions is positioned for rotation about a central axis of the inner chamber. A gear assembly operationally connected to the reciprocating pistons forces the flywheel to rotate and impart torque to a central shaft extending though the inner chamber.

12 Claims, 9 Drawing Sheets

ROTARY INTERNAL COMBUSTION ENGINE

BACKGROUND OF THE INVENTION

This invention relates to engines, and more particularly, to an internal combustion engine that can be used either as a power source for a motor-driven machinery or a pump.

The convention internal combustion engine used as a power source in the industry has one or more cylinders with pistons moving within the cylinders; the cylinders are arranged in a straight line, one after another, or in a V configuration. Such engines are inefficient as a large amount of power is lost in moving the pistons up and down along the line before the energy reaches an output shaft. Conventional internal combustion engines have valves that regulate the intake of the fuel, valve screws, rockers, lifters, timing belts, head gaskets, and other elements that constitute the structure of the engine; these elements, while required, increase the expense while not substantially increasing the output energy.

Rotary type engines overcome some of the problems associated with conventional reciprocating piston engines. Rotary piston engines are different types of internal combustion engines and consequently require less space for operating the motor-driven machinery. The most popular rotary engine is the so-called Wankle rotary engine, which has a piston with a triangular cross-section. The piston rotates in a specially shaped cylinder. Since the cylinder is irregularly shaped, it has problems with sealing, which translates into high fuel consumption and lower input to output energy ratio.

There is room, therefore, for improving a rotary internal combustion engine. The present invention contemplates elimination of drawbacks associated with conventional engines and provision of a novel rotary engine that occupies less space and has higher input/output energy ratio.

SUMMARY OF THE INVENTION

It is, therefore, an object of the present invention to provide a rotary type piston engine that uses reciprocating pistons moving in rotating cylinders.

It is another object of the present invention to provide a rotary engine that generates high torque for rotating an output shaft and provides greater fuel efficiency as compared to other rotary type engines.

These and other objects of the invention are achieved through a provision of a rotary engine, which has a housing defining a circular inner chamber. A plurality of cylinders is positioned in the inner chamber, each of said cylinders having a longitudinal axis extending radially in relation to a center of the chamber. Each of the cylinders houses a reciprocating piston mounted for axial movement in a respective cylinder towards and away from the center of the inner chamber.

The inner chamber houses a flywheel and a gear assembly operationally connected to the reciprocating pistons. The flywheel has a plurality of distinct vanes, between which at least a portion of the gear assembly is mounted. The flywheel is mounted for rotation inside the inner chamber with a flywheel ring fitted in the inner chamber. The flywheel ring is provided with a plurality of equidistantly spaced openings, each sized and shaped for receiving cylinders therein.

The gear assembly comprises a pair of parallel spaced-apart main gear wheels mounted for rotation about a central axis of said inner chamber and a plurality of planetary gear wheels operationally connected to a respective reciprocating piston. Each of the smaller planetary gear wheels engages a respective main gear wheel and transmits rotational force to the main gear wheels. The planetary gear wheels are mounted in pairs of spaced-apart parallel planetary gear wheels; they are provided with gear teeth that mesh with the gear teeth of the main gear wheels. The distance between the planetary gear wheels in each of the pairs of planetary gears is substantially similar to a distance between the spaced main gear wheels.

BRIEF DESCRIPTION OF THE DRAWINGS

Reference will now be made to the drawings, wherein like parts are designated by like numerals and wherein.

DETAILED DESCRIPTION OF THE PREFERRED EMBODIMENT

Figure 1:
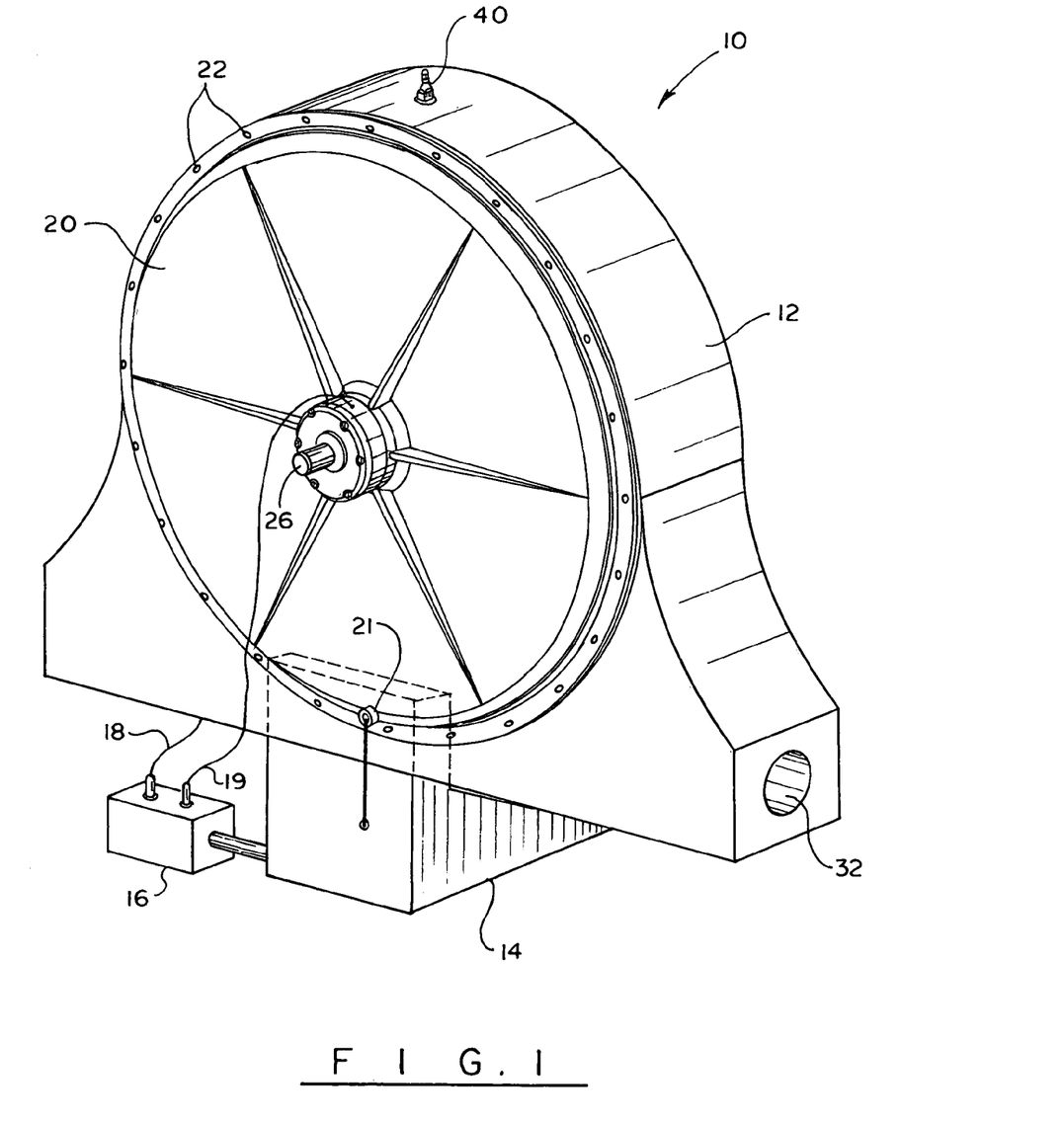
FIG. 1 is a perspective view of the rotary engine in accordance with the present invention supported by a schematically illustrated oil pan.
Figure 2:
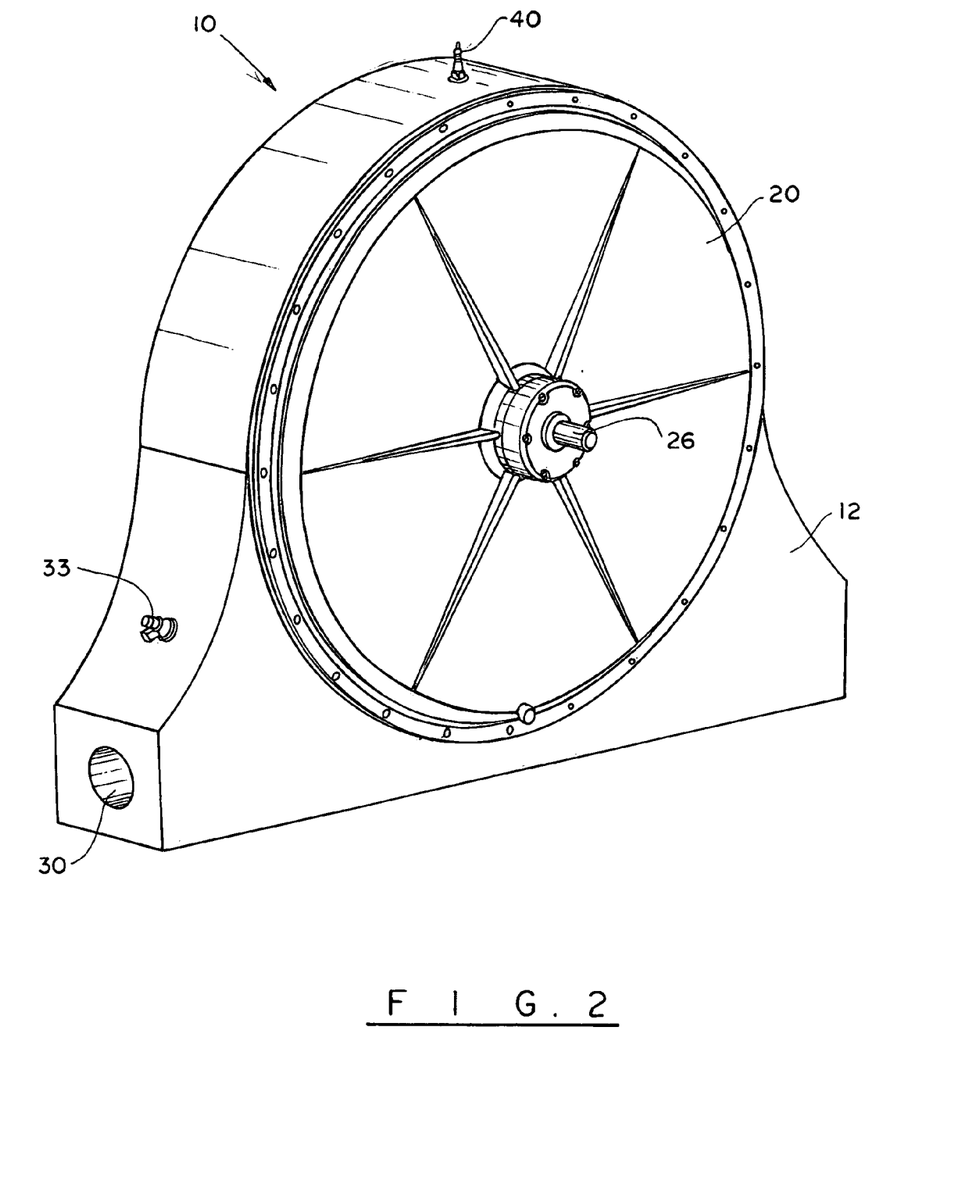
FIG. 2 is a perspective view of the rotary engine in accordance with the present invention.

Turning now to the drawings in more detail, numeral 10 designates the rotary internal combustion engine in accordance with the present invention. The engine 10 comprises a housing, or outer casing 12, which can be mounted to rest on an oil pan 14. An oil pump 16 is connected to the engine by oil lines 18 and 19 schematically shown in FIG. 1. The housing 12 is made from a non-corrosive material suitable for retaining rotating rotary engine block therein.

The housing 12 is provided with a cover 20, which protects the internal working parts of the engine and protects the internal moving parts of the engine during operation. The cover 20 is secured to the housing 12 by a plurality of securing means 22, which can be screws, bolts, or other such suitable fasteners. An opening 21 is formed in the lower part of the cover 20 to allow oil exit from an internal chamber formed in the housing 12. The oil may exit directly through the opening 21 or a plug may be inserted into the opening 21 to guide exit of oil into the oil pan 14.

A central opening 24 formed in the cover plate 20 allows extension of an output end 26 of a drive shaft 28 therethough. The drive shaft 28 is guided through the opening 24 by a drive shaft guide 27 and sealed by a drive shaft gasket 25. The output end 26 of the output shaft 28 extends through the opening 24 a distance from the cover plate 20 to allow connecting of the engine 10 to a motor-driven machinery (not shown).

An air intake opening 30 is formed in a lower side of the housing 12 and an exhaust gas opening 32 is formed in the opposite lower side of the housing 12 below the cover plate 20. The intake opening 30 allows air to enter the interior of the housing 12 and proceed to the combustion chamber via vacuum pressure with the possible combustible of an external turbo system or super charger pressure system.

A fuel injection member 33 is secured on the side of the housing 12 above the air intake 30. The air intake opening 30 communicates with an intake groove 34 formed in the lower part of an internal chamber 36 on the housing 12. The exhaust opening 32 communicates with an exhaust groove 38 formed in the lower part of the chamber 36. The exhaust opening 32 allows exhaust of emission gases following combustion, assisted by the pressure created by a piston during an exhaust stroke. Emission gas exhaust may also be assisted by an optional turbo. A spark plug 40 is fitted in the top part of the housing 12 for initiating combustion of the fuel and air mixture inside a cylinder communicating with the spark plug 40.

The rotor block is encased inside the chamber 36. The chamber 36 houses the reciprocating pistons, a fly wheel 60, main gear wheels 62, 64, planetary gear wheels as well as the output shaft 28. A cover plate gasket 42 is mounted about the circumference of the cover plate 20 and seals the circumference of the cover plate against the inner wall of the chamber 36 to prevent leakage of intake gases and liquids from the chamber 36. The heavy dynamically balanced flywheel 60 is located inside a flywheel ring 44; it builds up rotational force with speed and momentum of the gear rotation and effectively stores the energy. The flywheel 60 is made of four distinct portions or vanes, between which at least a portion of the planetary gear wheels is mounted. The flywheel 60 is held firmly against a bearing engaging the central shaft 28.

The flywheel ring 44 is mounted inside the chamber 36 and has slightly smaller outer diameter than the interior diameter of the chamber 36. The flywheel ring 44 is sealed against the inner wall of the chamber by a gasket 46. The wheel 44 has four openings 45 formed about the circumference of the wheel and spaced at 90 degrees from each other. The openings 45 are each adapted for receiving a cylinder with a reciprocating piston therein. A compression ring is fitted in each opening 45 to prevent gas leakage from the cylinders. A compression ring guide 47 is provided for retaining the compression rings in place. The flywheel ring 44 rotates inside the chamber 36 along with the flywheel and the engine cylinders during operation about a central axis defined by the shaft 28.

Figure 3:
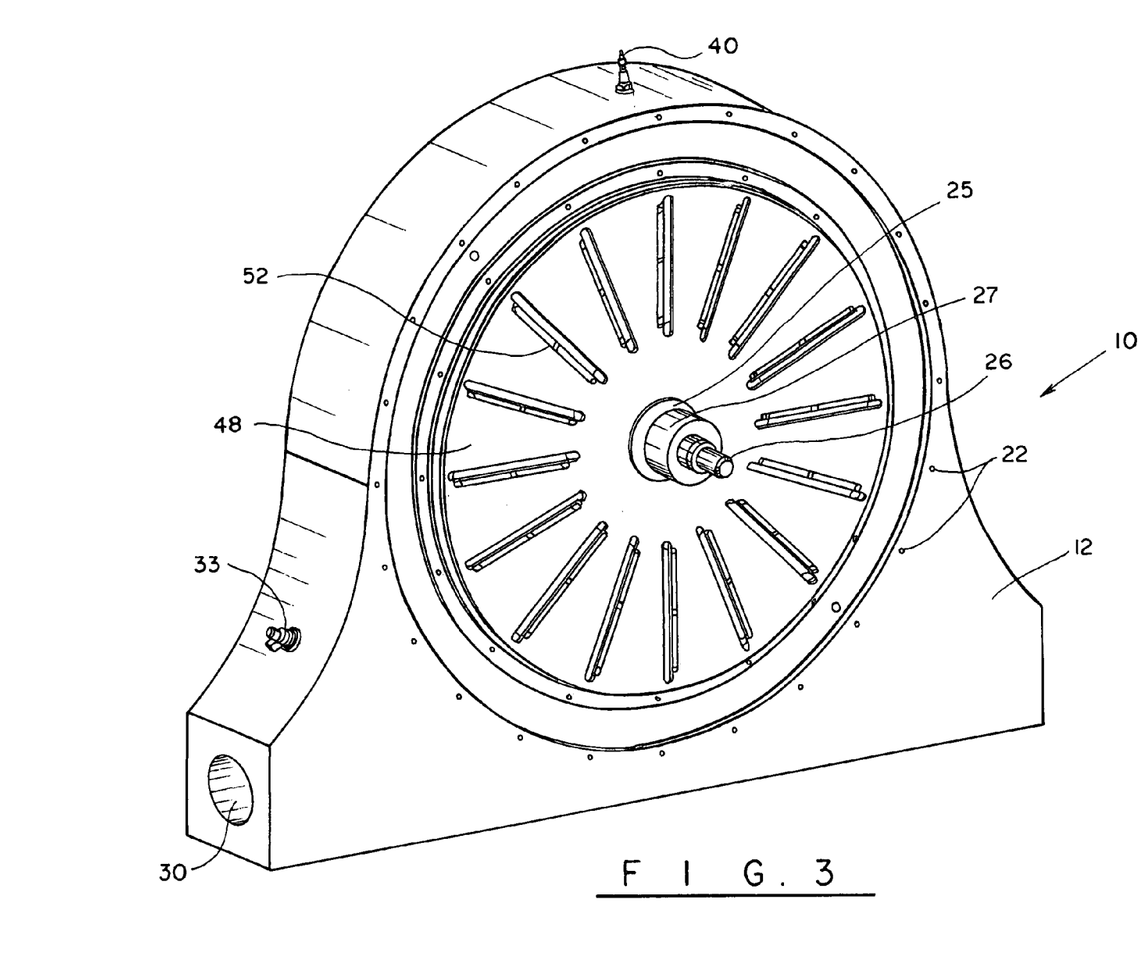
FIG. 3 is a perspective view of the rotary engine in accordance with the present invention with the cover removed.

A flywheel cover plate 48 is mounted inside the housing and protects the rotating wheel 44 and rotates therewith. A plurality of radially extending grooves 50 are formed about the circumference of the cover 48. An oil fin 52 is fitted in each of the grooves 50 as shown in detail in FIG. 3. The oil fins 52 pick oil from the bottom of the combustion chamber and cool the oil as the flywheel cover 48 rotates along with the flywheel ring 44.

Mounted in the chamber 36 is a pair of main gear wheels 62, 64; the wheels 62, 64 are secured in the housing 12 and do not spin inside the fly wheel ring 44. The output shaft 28 is operationally connected to one or more main gear wheels and receives torque from the main gear wheels during operation of the engine. In this embodiment, there are two main gear wheels 62 and 64 provided. The main gear wheels 62 and 64 are connected to each other by a plurality of securing members 66 (FIG. 4) and are retained in a parallel relationship to each other by a main bearing 59, which extends through an opening 61 formed in the fly wheel 60 (FIG. 5). The main gear wheels 62 and 64 are provided with a plurality of gear teeth 68 formed about the outer circumference of the wheels 62 and 64.

The main gear wheels 62 and 64 are operationally connected to and receive the rotational force from, a plurality of "planetary gear wheels," which have matching teeth formed about their outer circumference to mesh with the teeth 68 and transmit torque to the main gear wheels 62, 64. The main gear wheel 62 is engaged by the planetary gears 72, 76, 78, and 82 while the main gear 64 is engaged by planetary gears 70, 74, 80, and 84. The planetary gears are arranged in parallel pairs, supported by a connecting shaft that provides a common axis or rotation for the pair of planetary gears. The planetary gears 70 and 72 rotate about a common axis 86, the planetary gears 74 and 76 rotate about a common axis 88, the planetary gears 78 and 80 rotate about a common axis 90, and the planetary gears 82 and 84 rotate about a common axis 92. Of course, if only one main gear wheel is provided, there wilt be no need to the pairs of planetary gear wheels.

Mounted within the combustion chamber 36 is a plurality of reciprocating pistons moving within their respective cylinders. In the embodiment shown herein, four cylinders with four reciprocating pistons are illustrated. It will apparent to persons skilled in the art that the number of cylinders can vary depending on the particular design and desired power output of the engine. The cylinders and their respective pistons are mounted to the flywheel ring 44 and extend inwardly into the annular space defined by the flywheel ring 44. The cylinders and their respective pistons extend in a radial direction from the center of the ring 44. The tops of the cylinders are inscribed within the circumference defined by an inner wall 94 of the chamber 36.

A first cylinder 100 is provided with a reciprocating piston 102 that moves towards and away from the center 104 of the rotor block. The piston 102 is connected to a piston rod 108 which carries a crankshaft 110 on the inner end thereof. The crankshaft 110 engages a bearing, which contacts an off-center shaft connecting the planetary gears 82, 84. To and fro movement of the piston 102 transmits movement to the connecting shaft and causes rotation of the planetary gears, and this to the main gears 62, 64. A compression ring 112 seals the cylinder against the interior of the chamber 36. A wrist pin 114 secures the piston rod 108 with the piston 102.

A second cylinder 120 has a longitudinal axis, which extends at 90 degrees to the longitudinal axis of the first cylinder 100. It will be apparent to persons skilled in the art that the position of the cylinders changes, depending on their relative position in the chamber 36, and at a particular moment one of the cylinders serves as a combustion cylinder, another—as an intake cylinder, a third as a compression cylinder, and a fourth—as an exhaust cylinder. With rotation, another cylinder becomes a combustion cylinder, etc.

The second cylinder 120, similarly to the cylinder 100 is provided with a reciprocating piston 122 moving inside the cylinder 120. The piston is engaged to a piston rod 124 and a crankshaft 126. The piston 120 is sealed against the inner wall 94 of the chamber 36 by a compression ring 123. The crankshaft 126 contacts a bearing 130, which is engaged with an off-center connecting shaft, as will be explained in more detail hereinafter. The crankshaft 126 transmits rotation to the connecting shaft causing rotation of the planetary gears 70 and 72, thereby transmitting torque to the main gear 62 and 64.

A third cylinder 136 has a longitudinal axis extending at about 90 degrees in relation to the axis of the cylinder 120 and 180 degrees in relation to the axis of the cylinder 100.

The cylinder 136 houses a reciprocating piston 137, which moves in a radial direction in relation to the center 104 of the chamber 36. The piston 137 is secured by a wrist pin 140 to a piston rod 142 that carries a crankshaft 144 on the innermost end thereof. A bearing 146 engages the crankshaft 144 and an off-center connecting rod secured between the planetary gears 74, 76. The piston rod 142 moves the piston rod 142, causing rotation of the planetary gears 74 and 76 within the chamber 36. A compression ring 138 seals the cylinder 136 against the inner wall of the chamber 36 and prevents gas leakage from the cylinder during operation.

A fourth piston 150 has a longitudinal axis oriented at 90 degrees in relation to the axes of the cylinders 100 and 136 and 180 degrees in relation to the longitudinal axis of the piston 120. The fourth cylinder 150 has a reciprocating piston 152 and is sealed against the interior of the chamber 36 by a compression ring 154. A wrist pin 156 connects the piston 152 to a piston rod 158, which in turn carries a crankshaft 160 on the innermost end thereof. The crankshaft contact a bearing 161, which engages an off-center connecting shaft to transmits movement of the piston rod 158 to the planetary gears 78 and 80 causing their rotation and in turn causing rotation of the main gears 62 and 64.

Figure 8:
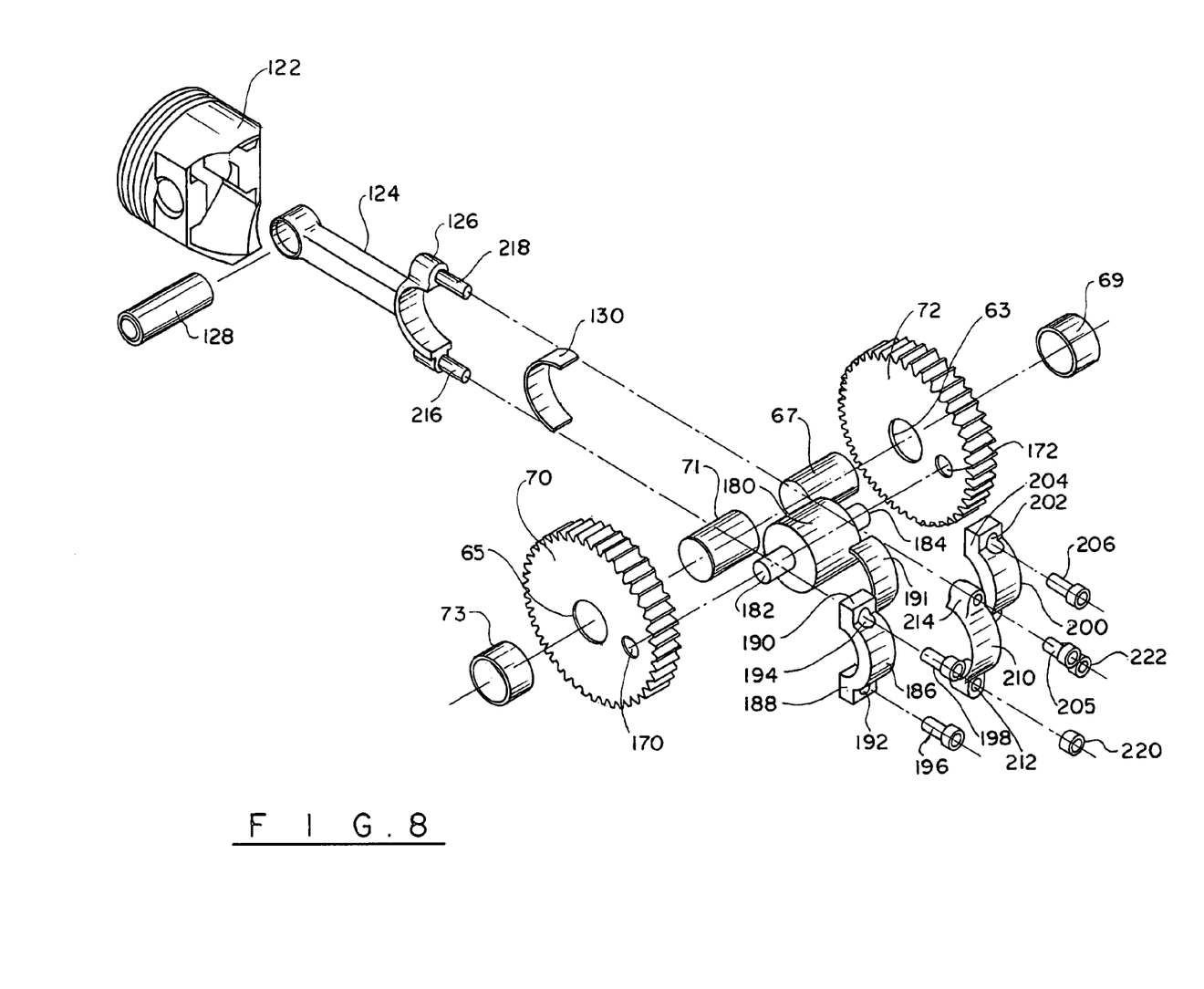
FIG. 8 is a detail exploded view showing one of the reciprocating pistons of the present invention and a pair of planetary gears associated therewith.

FIG. 8 illustrates in detail a manner of connection between the piston 124 with the planetary gears 70 and 72. It will be understood that such connection is applicable to all pistons used in the engine structure of the instant invention. As can be seen in the drawing, each of the planetary gears 70, 72 is provided with a central opening 63, 65, respectively. A gear shaft 67 is positioned in the opening 63 and supported by a bearing 69. A shaft 71 is positioned in the opening 65 and supported therein by a bearing 73. The planetary gear 70 has an off center opening 170 and the planetary gear 72 has an off center opening 172. The connecting off-center shaft 180 has reduced diameter outwardly extending portions 182 and 184. The portions 182 and 184 fit within respective off-center openings 170 and 172 securing the planetary gears 70 and 72 in a parallel relationship to each other.

An arcuate cap 186 has outwardly extending flanges 188 and 190. The flanges 188 and 190 are provided with openings 192, 194 respectively for receiving fastening members 196 and 198 therein. This securing means can be screws, bolts or other suitable fasteners that allow securing the cap 186 to the flywheel 60. The cap 186 is adapted for engaging the shaft 71, which extends through the central opening 65 of the planetary gear 70. A similar cap 200 is provided for engaging the central shaft 67, which passes through the opening 63 of the planetary gear 72. The cap 200 similarly to the cap 186, is provided with outwardly extending flanges having openings therein. Only one opening 202 can be seen in a flange 204 in FIG. 8. A fastening member 206 passes through the opening 204 for securing the cap 200 to the flywheel 60.

An arcuate cap 210 is provided for securing the off-center shaft 180 to the crankshaft 126. The cap 210 is provided with outwardly extending flanges 212, 214, each having openings for receiving securing members 216, 218 of the crankshaft 126. The outwardly extending securing members 216, 218 are secured by fastening member, for instance nuts 220, 222, after passing through openings formed in the flanges of the cap 210. A pair of bearings 130 and 131 fit between the crankshaft 126 and the cap 210 respectively, engaging the off-center shaft 180 and protecting the shaft 126 during rotation.

Figure 4:
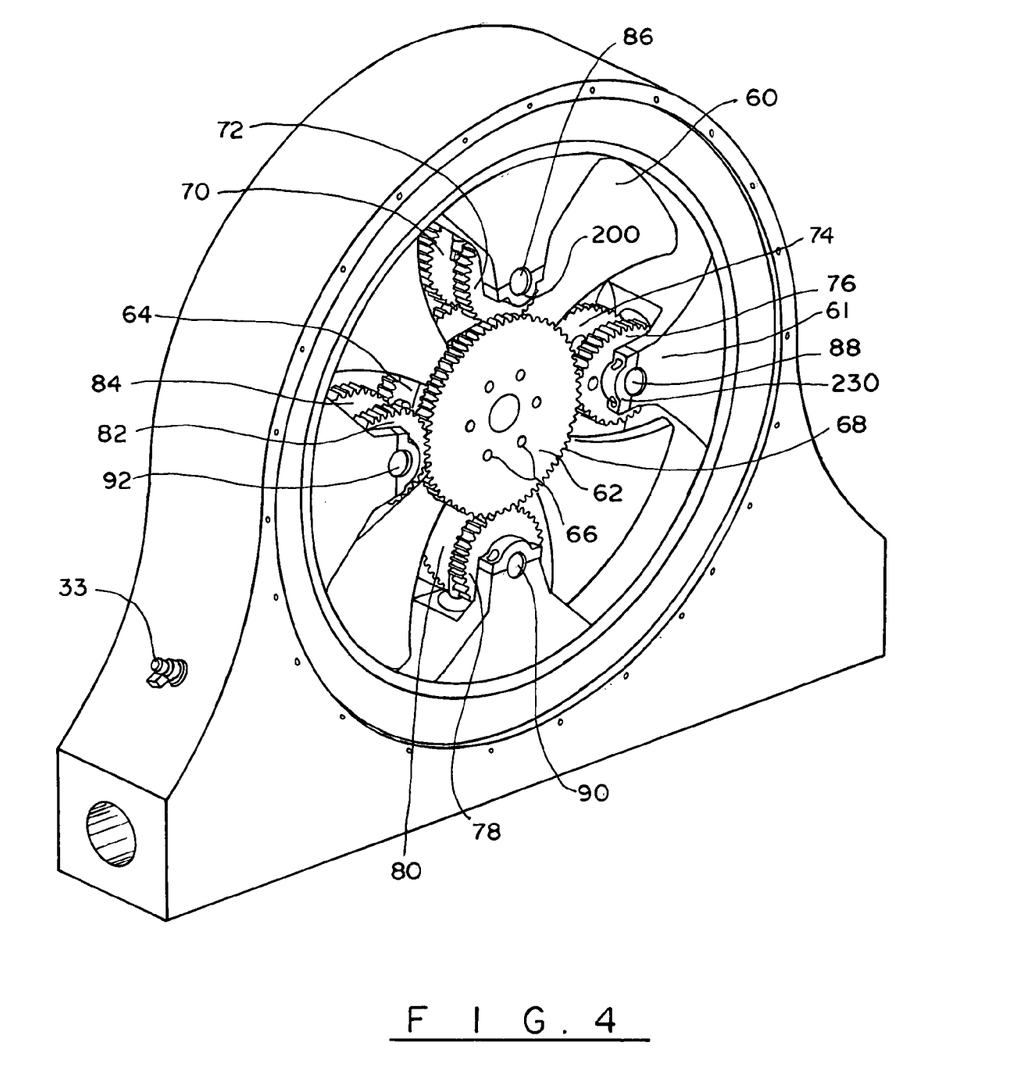
FIG. 4 is a perspective view of the rotary engine of the present invention with the cover removed and showing internal gears.
Figure 5:
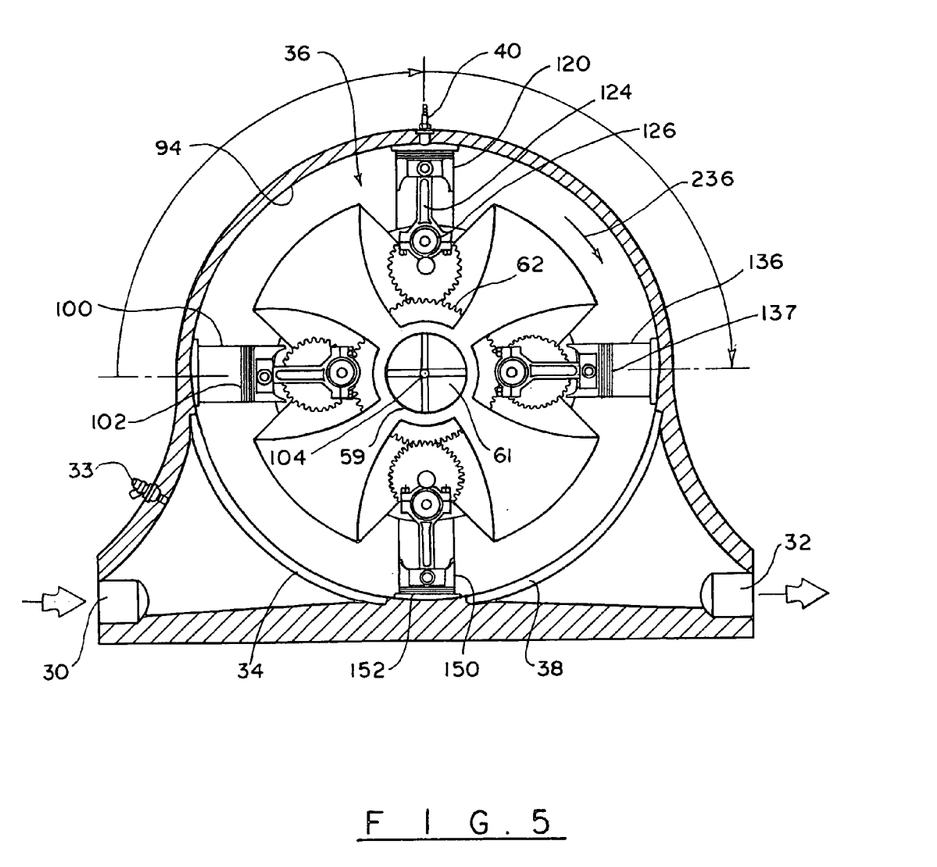
FIG. 5 is a partially cross-sectional view showing the rotary engine of the present invention with the reciprocating pistons.
Figure 6:
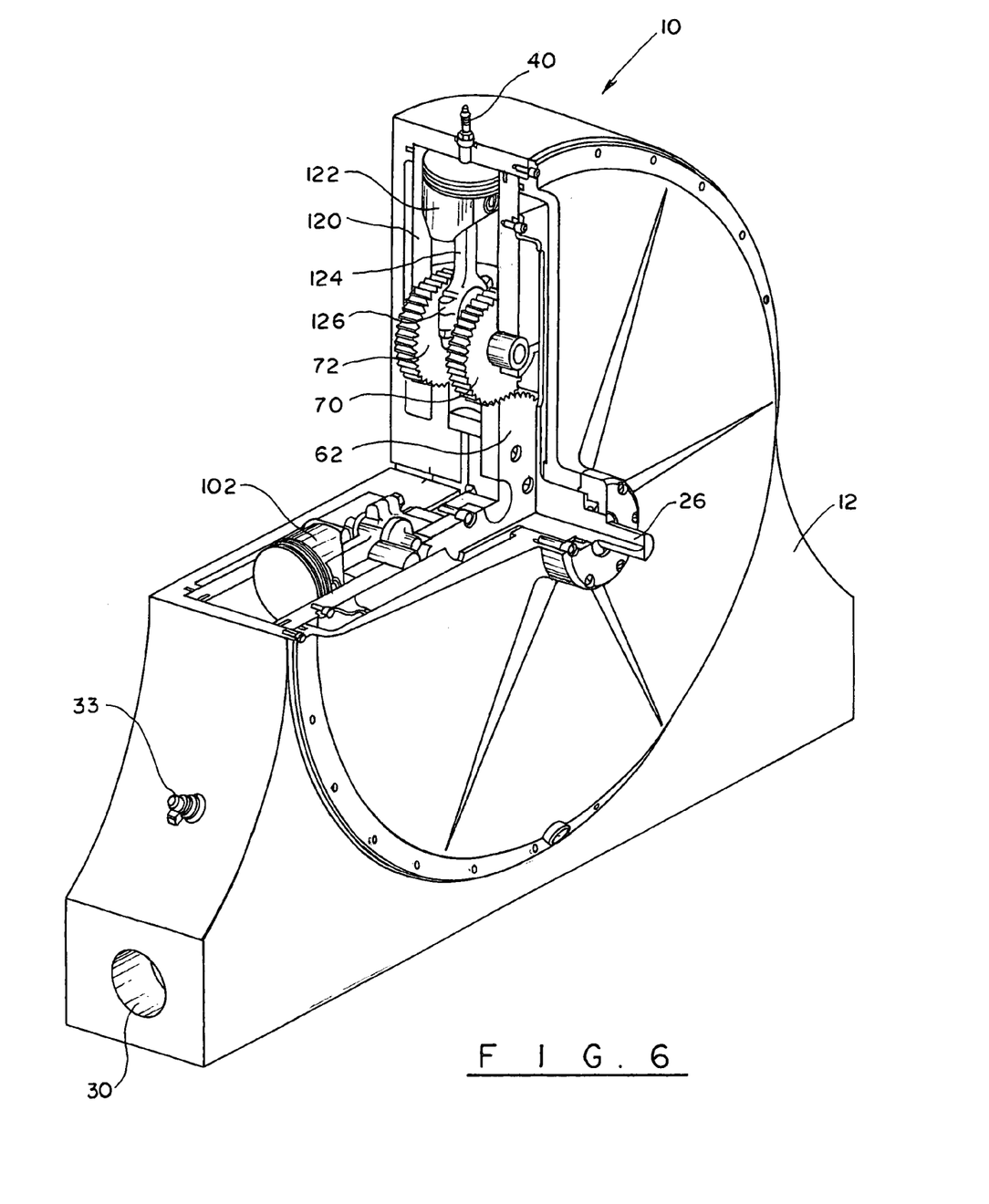
FIG. 6 is a cutaway view of the engine of the present invention showing a pair of planetary gears.
Figure 7:
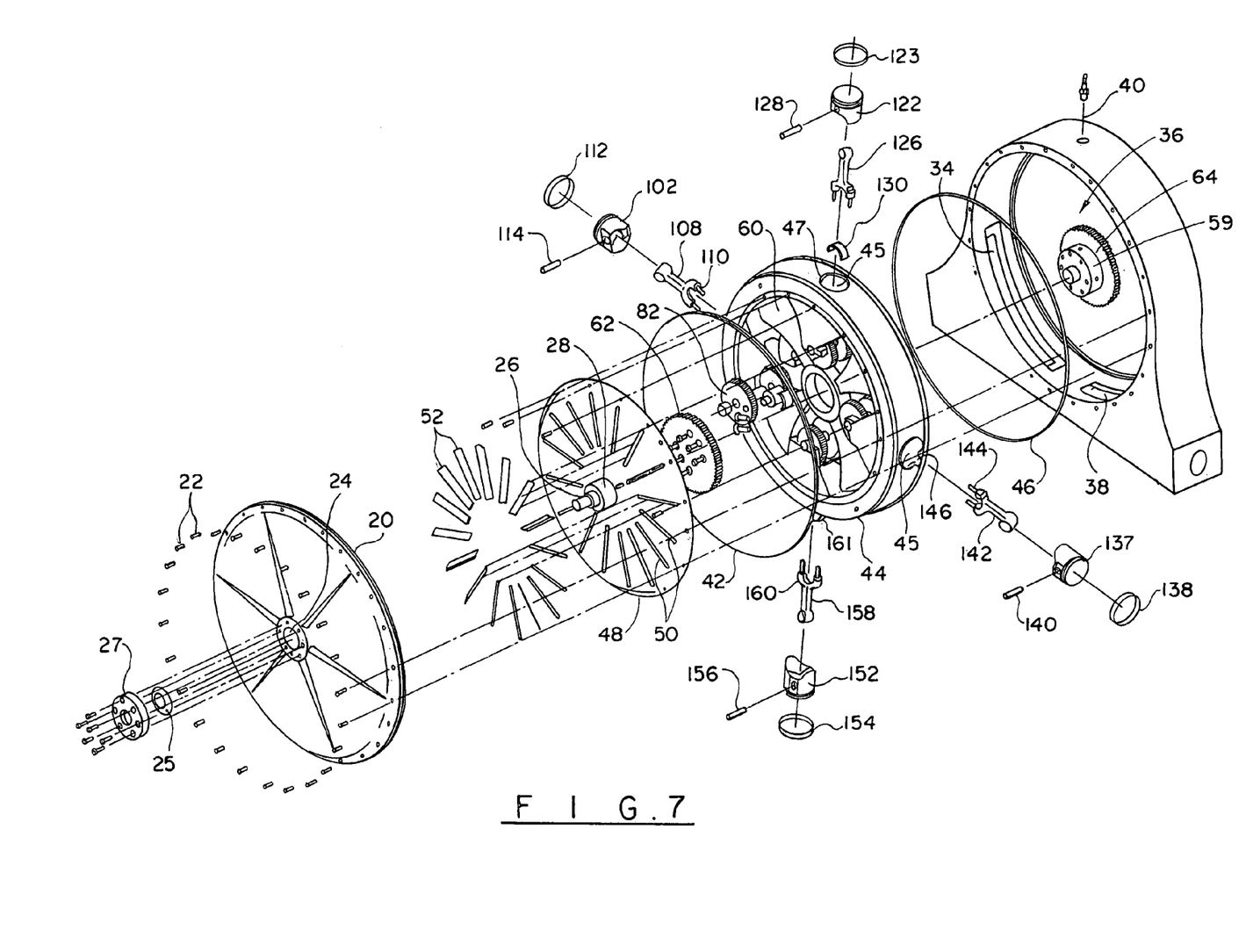
FIG. 7 is an exploded view of the rotary engine in accordance with the present invention.

The caps in position of the caps 200 are secured to the flywheel 60, as shown in FIG. 4. It will be understood that the caps 186 are similarly secured to the flywheel 60 on the opposite side of the flywheel 60. The fastening members 196, 198 and 205, 206 engage with an end 61 of the flywheel 60. The securing members can be seen in engaging a cap 230 on the planetary gear 76. It would be understood by persons skilled in the art that identical arrangements are provided for each of the planetary gears.

FIG. 5 illustrates the four strokes of the engine 10. Starting with the combustion stroke illustrated in relation to piston 120, the spark plug 40 sends an igniting charge to the mixture of air and gasoline in the cylinder 120, expanding the gas inside the cylinder and causing compression of the piston as shown in relation to the compression stroke of the cylinder 136. The piston 137 moves towards the center of the chamber 36, causing movement of the planetary gear and rotation of the main gear wheels 62, 64.

The third quadrant is the exhaust quadrant containing the cylinder 150, wherein exhaust gas released during the compression stroke exhaust through the opening 32. The intake stroke is presented in the quadrant of the circular chamber 36 containing the cylinder 100 illustrates the location of the piston 102 at a position innermost towards the center 104 of the chamber 36, at the time when the air enters the chamber 36 through the air intake port 30 and fuel is delivered through the fuel injector 33. The main gears 62, 64 are rotated in the direction of an arrow 236 as shown in FIG. 4, transmitting rotation to the output shaft end 26. The shaft end 26 can be connected to machinery, pump, or other apparatus that needs power for operation.

The centrifugal force created by the operation of the engine 10 through the combustion and compression strokes provides sufficient energy to the machinery operationally connected thereto. By connecting the cylinders to extend in a radial direction from the center of the main gear, the present invention achieves high energy output while occupying considerably less space than is possible with conventional internal combustion engine but in the cylinders positioned in line or in a "V" configuration.

Figure 9:
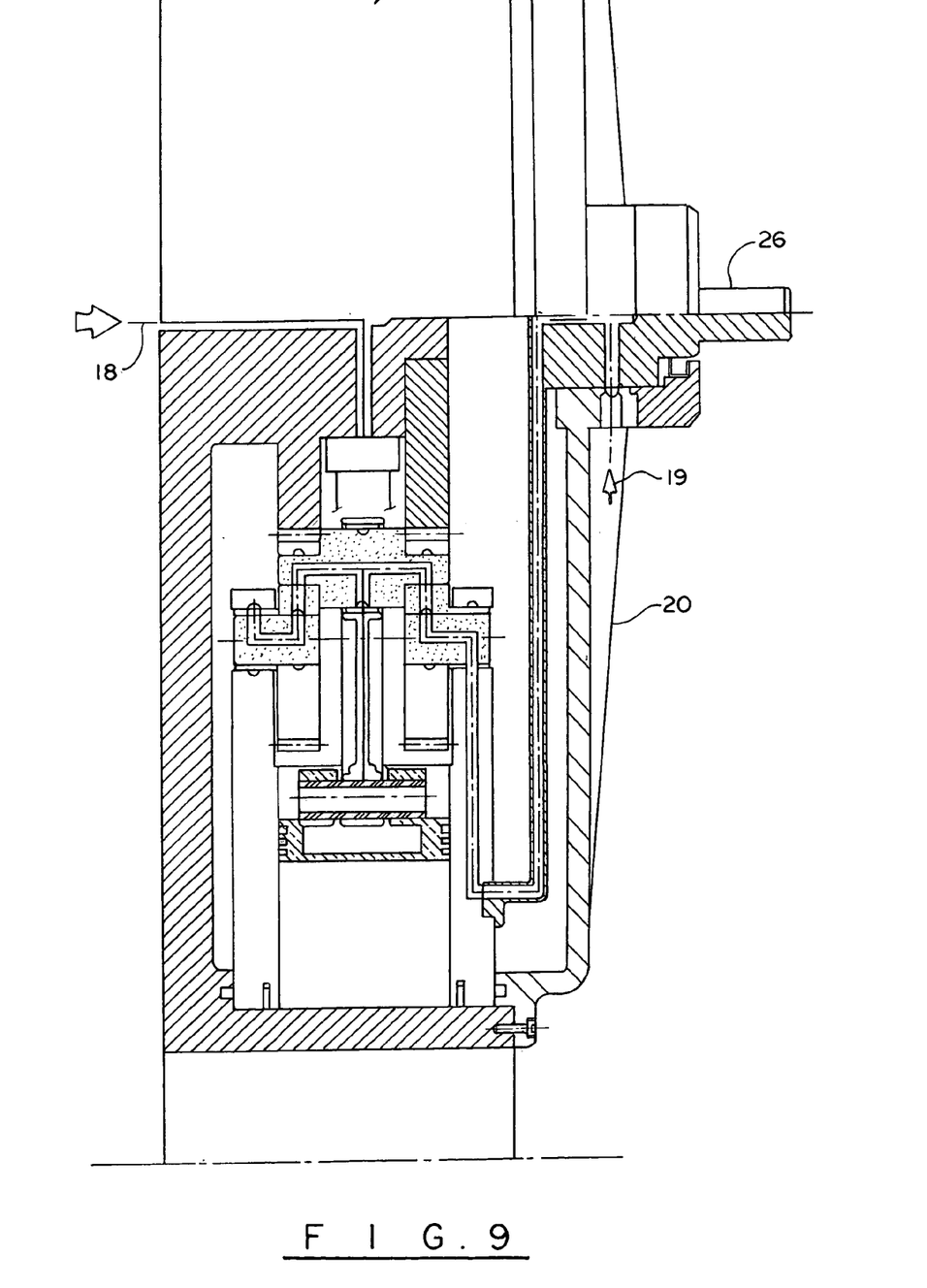
FIG. 9 is a cross-sectional view illustrating an oil flow in the system of the present invention.

FIG. 9 illustrates circulation of oil in relation to one of the cylinders of the engine of the present invention, showing the oil path from the oil delivering conduits 18 and 19.

Many changes and modifications can be made in the design of the present invention without departing from the spirit thereof. I therefore pray that my rights to the present invention be limited only by the scope of the appended claims.

I claim:

1. A rotary engine apparatus, comprising:
  a housing defining a circular inner chamber;
  a plurality of cylinders positioned in said chamber, each of said cylinders having a longitudinal axis extending radially in relation to a center of the chamber;
  a plurality of reciprocating pistons, each mounted for axial movement in a respective cylinder;
  a gear assembly operationally connected to said reciprocating pistons;
  a central shaft operationally connected to said gear assembly for receiving rotational force from said gear assembly; and
  a flywheel having a plurality of distinct vanes, between which at least a portion of the gear assembly is mounted, wherein a flywheel ring is fitted in said inner chamber and surrounding said flywheel, said flywheel ring being provided with an inwardly extending flange, and wherein a flywheel cover is detachably secured to said flange, said flywheel cover being provided with a plurality of radially extending grooves, and wherein each of said radial grooves receives an elongated fin for facilitating circulation of a lubricating substance in said engine.

2. A rotary engine apparatus, comprising:

a housing defining a circular inner chamber;

a plurality of cylinders positioned in said chamber, each of said cylinders having a longitudinal axis extending radially in relation to a center of the chamber;

a plurality of reciprocating pistons, each mounted for axial movement in a respective cylinder;

a gear assembly operationally connected to said reciprocating pistons, said gear assembly comprising a pair of parallel spaced-apart main gear wheels mounted for rotation about a central axis of said inner chamber and a plurality of planetary gear wheels operationally connected to a respective reciprocating piston, each of said planetary gear wheels engaging a respective main gear wheel and transmitting rotational force to said main gear wheels, said planetary gear wheels being mounted in pairs of spaced-apart parallel planetary gear wheels, and wherein a distance between said planetary gear wheels in each of said pairs is substantially similar to a distance between the spaced main gear wheels; and a flywheel having a plurality of distinct vanes, between which at least a portion of the gear assembly is mounted, said flywheel being mounted for rotation inside the inner chamber with a flywheel ring fitted in said inner chamber, and wherein said flywheel ring is provided with a plurality of equidistantly spaced openings, each sized and shaped for receiving a respective of said plurality of cylinders therein, said flywheel ring being provided with an inwardly extending flange, and wherein a flywheel cover is detachably secured to said flange, said flywheel cover being provided with a plurality of radially extending grooves, and wherein each of said radial grooves receives an elongated fin for facilitating circulation of a lubricating substance in said engine.

3. The apparatus of claim 2, further comprising a cover plate secured to said housing and covering said inner chamber.

4. The apparatus of claim 3, wherein said cover plate is provided with an opening to allow draining of the lubricating substance from said housing.

5. The apparatus of claim 2, wherein said engine is a four-stroke engine.

6. The apparatus of claim 2, further comprising an air intake opening for delivering air inside the inner chamber and an exhaust opening in fluid communication with said inner chamber for allowing exhaust gases to exit the inner chamber.

7. The apparatus of claim 6, wherein said inner chamber is defined by a circular wall, and wherein an intake groove and an exhaust groove are formed in said wall, said intake groove communicating with the intake opening and said exhaust groove communicating with the exhaust opening.

8. The apparatus of claim 2, further comprising a fuel injector mounted in fluid communication with said inner chamber for delivering an ignitable fuel to said inner chamber, and a spark plug receptacle formed in said housing for receiving a spark plug therein.

9. The apparatus of claim 2, further comprising a central shaft operationally connected to said gear assembly for receiving rotational force from said gear assembly, and wherein each of said planetary gear wheels is provided with a central opening for receiving a portion of the central shaft therein and an off-center opening for receiving an off-center shaft therein.

10. The apparatus of claim 9, wherein each of the portions of the central shaft is provided with an arcuate cap, and wherein each of said caps is secured to the flywheel.

11. The apparatus of claim 9, wherein each of said reciprocating pistons is provided with a piston rod carrying a crankshaft on a free end thereto.

12. The apparatus of claim 11, wherein said off-center shaft is provided with an arcuate cap, and wherein said cap is secured to a crankshaft of a respective reciprocating piston.

* * * * *